US006434808B1

(12) United States Patent
McKay

(10) Patent No.: US 6,434,808 B1
(45) Date of Patent: Aug. 20, 2002

(54) COMPACT INSTALLATION TOOL

(75) Inventor: Albert A. McKay, Stoney Creek (CA)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 09/703,453

(22) Filed: Nov. 2, 2000

(51) Int. Cl.[7] ................................................ B23P 19/04
(52) U.S. Cl. .............................. 29/237; 29/252; 29/282
(58) Field of Search ........................ 29/237, 282, 283.5, 29/252, 520; 72/453.02

(56) References Cited

U.S. PATENT DOCUMENTS 5,305,510 A * 4/1994 Croft et al. .................. 29/237
5,592,726 A * 1/1997 Suresh ........................ 29/237

* cited by examiner

*Primary Examiner*—Robert C. Watson
(74) *Attorney, Agent, or Firm*—James Ray & Associates

(57) ABSTRACT

Hydraulic assembly tool having a tool fixed portion having a proximal end and a distal end. The tool fixed portion includes a hydraulic cylinder having a fluid pressure port at the proximal end of the tool fixed portion. The fluid pressure port is for receiving a fluid having a controllable pressure. The tool fixed portion includes a fixed jaw. The tool also has a moveable portion including a moveable jaw and a piston disposed in the hydraulic cylinder, the piston receiving a hydraulic force from the pressurized fluid. There is a compression spring engaging the tool fixed portion and the tool moveable portion, the compression spring urging the tool moveable portion including the moveable jaw in a direction opposite the direction of the hydraulic force. Increasing the pressure of the fluid causes the moveable jaw to move in the direction of the hydraulic force, and decreasing the pressure of the fluid permits the spring to move the tool moveable portion including the moveable jaw in a direction opposite the direction of the hydraulic force.

24 Claims, 2 Drawing Sheets

COMPACT INSTALLATION TOOL

CROSS-REFERENCE TO RELATED APPLICATIONS

The present invention is closely related to the following United States patent applications: REMOTE ACTUATION OF INSTALLATION TOOLING PUMP, U.S. Ser. No. 09/677,921 and LOKRING® FITTING HAVING IMPROVED ANTI-TORSION CAPABILITY, U.S. Ser. No. 09/677,920. These patent applications were filed concurrently on Oct. 3, 2000.

FIELD OF THE INVENTION

The present invention relates, in general, to installation tooling and, more specifically, the invention relates to tooling for installation of swage ring fittings.

BACKGROUND OF THE INVENTION

Swaging, which involves plastic deformation of a workpiece, is one method of assembly. For example, one type of fitting for tubes, or pipes, is a swage ring which fits over the tube or pipe. A swaging tool engages the swage ring fitting and plastically deforms it so as to firmly engage the tube or pipe. Prior art tools for this purpose have relatively moveable jaws which engage the swage ring. Force supplied by a hydraulic cylinder in the tool causes relative movement of the jaws which accomplishes the swaging operation. When the swaging operation is: completed, the hydraulic pressure in the tool is reduced and a return spring returns the jaws to their original position and the tool is removed from the workpiece.

An example of a prior art tool is taught in U.S. Pat. No. 5,305,510: Hydraulic Assembly Tool with Improved Load Bearing Arrangement for Tube Fittings. An example of the type of fitting which this tool engages is taught in U.S. Pat. No. 5,114,191: Pipe Fitting with Coupling Body and Improved Isolation Tooth Arrangement. Prior art hydraulic assembly tools of the type cited are bulky and heavy and are difficult to use in remote or confined spaces.

The teachings of U.S. Pat. No. 5,305,510 and 5,114,191 as well as the copending patent applications cited above: REMOTE ACTUATION OF INSTALLATION TOOLING PUMP and LOKRING (r) FITTING HAVING IMPROVED ANTI-TORSION CAPABILITY are hereby incorporated into the present application by reference thereto.

SUMMARY OF THE INVENTION

The present invention is a hydraulic assembly tool which includes a tool fixed portion having a proximal end and a distal end. The tool fixed portion includes a hydraulic cylinder having a fluid pressure port, at the proximal end of the tool fixed portion, for receiving a fluid having a controllable pressure. The tool fixed portion further includes a fixed jaw. The tool also has a moveable portion including a moveable jaw and a piston disposed in the hydraulic cylinder, the piston receiving a hydraulic force from the pressurized fluid. There is a compression spring engaging the tool fixed portion and the tool moveable portion, the compression spring urging the tool moveable portion including the moveable jaw in a direction opposite the direction of the hydraulic force. Increasing the pressure of the fluid causes the moveable jaw to move in the direction of the hydraulic force, and decreasing the pressure of the fluid permits the spring to move the tool moveable portion including the moveable jaw in a direction opposite the direction of the hydraulic force.

OBJECTS OF THE INVENTION

It is therefore one of the primary objects of the present invention to provide a compact hydraulic assembly tool.

Another object of the present invention is to provide a simplified hydraulic assembly tool.

Still another object of the present invention is to provide a hydraulic assembly tool having less length than prior art tools.

Yet another object of the present invention is to provide a hydraulic assembly tool with improved features for reacting offset loads.

A further object of the present invention is to provide a hydraulic assembly tool for swage ring fittings which is more compact than prior art assembly tools for swage ring fittings.

It is an additional object of the present invention to provide a hydraulic assembly tool for swage ring fittings which weighs less than prior art tools.

Still yet another object of the present invention is to provide a hydraulic assembly tool for swage ring fittings which employs a compression spring for a positive, strong return force.

Yet a further object of the present invention is to provide a hydraulic assembly tool for swage ring fittings having a minimum of components.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

Figure 1:
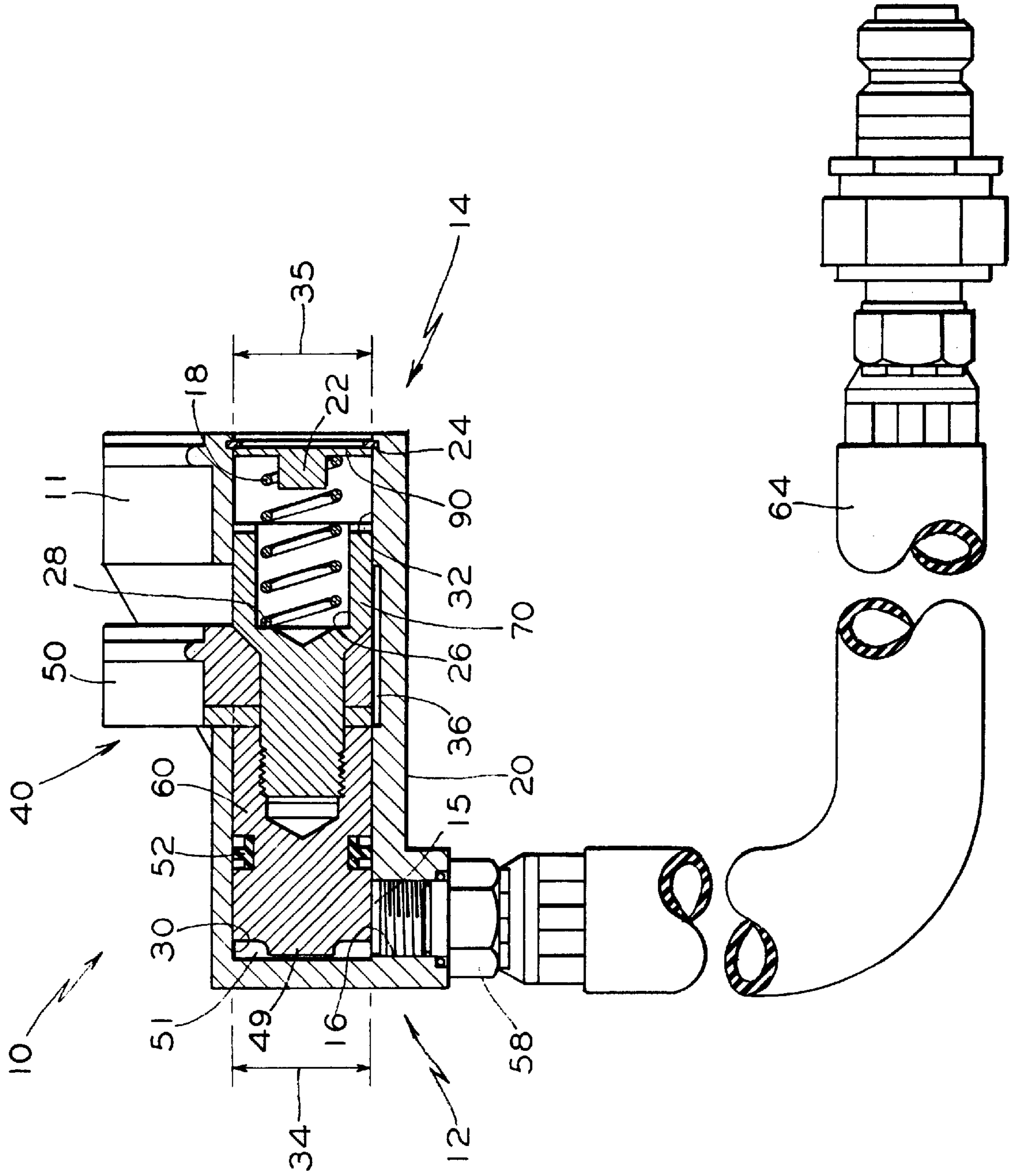
FIG. 1 is a median section of the invention with a hydraulic hose attached.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing figures for the sake of clarity and understanding of the invention.

Attention is now directed to FIG. 1 which illustrates the presently preferred embodiment of the invention. The hydraulic assembly tool, generally designated 10, has a tool fixed portion, generally designated 20, having a hydraulic cylinder, generally designated 30. Hydraulic assembly tool 10 also has a tool moveable portion, generally designated 40, which includes a moveable jaw, generally designated 50, a piston, generally designated 60, and preferably has a connecting member, generally designated 70. Attention is also directed to FIGS. 2, 3 and 4 for additional detail concerning the piston 60, the moveable jaw 50 and the connecting member 70.

The tool fixed portion 20 has a proximal end 12 and a distal end 14. Tool fixed portion 20 encloses hydraulic cylinder 30. A fluid pressure port 15 for hydraulic cylinder 30 is located at the proximal end 12 of such tool fixed portion 20. A fluid pressure port 15 has internal threads 16 for attachment of a quick disconnect hydraulic fitting 58. Fluid pressure port 15 is provided to receive a fluid having a controllable pressure. A fixed jaw 11 is disposed at the distal end 14 of the tool fixed portion 20.

Piston 60 is for receiving a hydraulic force from the hydraulic fluid whereby increasing the pressure of the hydraulic fluid causes piston 60 and, therefore, tool moveable portion 40 including moveable jaw 50 to move in the direction of the hydraulic force.

A compression spring 18 engages tool fixed portion 20 and tool moveable portion 40 to move the tool moveable portion 40 including moveable jaw 50 in a direction opposite the hydraulic force when the pressure of the hydraulic fluid is decreased.

In the presently preferred embodiment, a fixed seat, generally designated 90, for the compression spring 18 is disposed at the distal end 14 of tool fixed portion 20. Preferably, fixed seat 90 has a central protuberance 22 for centering spring 18. It is presently preferred that fixed seat 90 be attached to the tool fixed portion 20 by a lock ring 24.

Furthermore, in the presently preferred embodiment, tool moveable portion 40 includes a connecting member 70, which connects moveable jaw 50 to piston 60. Also, in the presently preferred embodiment, connecting member 70 has an internal bore 26 having a moveable seat 28 for compression spring 18. Preferably, a portion of compression spring 18 is contained within internal bore 26 of connecting member 70.

It is also preferred that tool fixed portion 20 have a distal bore 32 at the distal end of tool 10. Connecting member 70 slidably engages the distal bore 32 to guide such tool moveable portion 40 and to react moment loads on moveable jaw 50. Preferably, such distal bore 32 is concentric with hydraulic cylinder 30 and it, preferably, has a diameter 35 substantially equal to the diameter 34 of hydraulic cylinder 30.

Preferably, tool fixed portion 20 has a clearance portion 36 disposed between hydraulic cylinder 30 and distal bore 32. Clearance portion 36 prevents interference between moveable jaw 50 and tool fixed portion 20.

Figure 2:
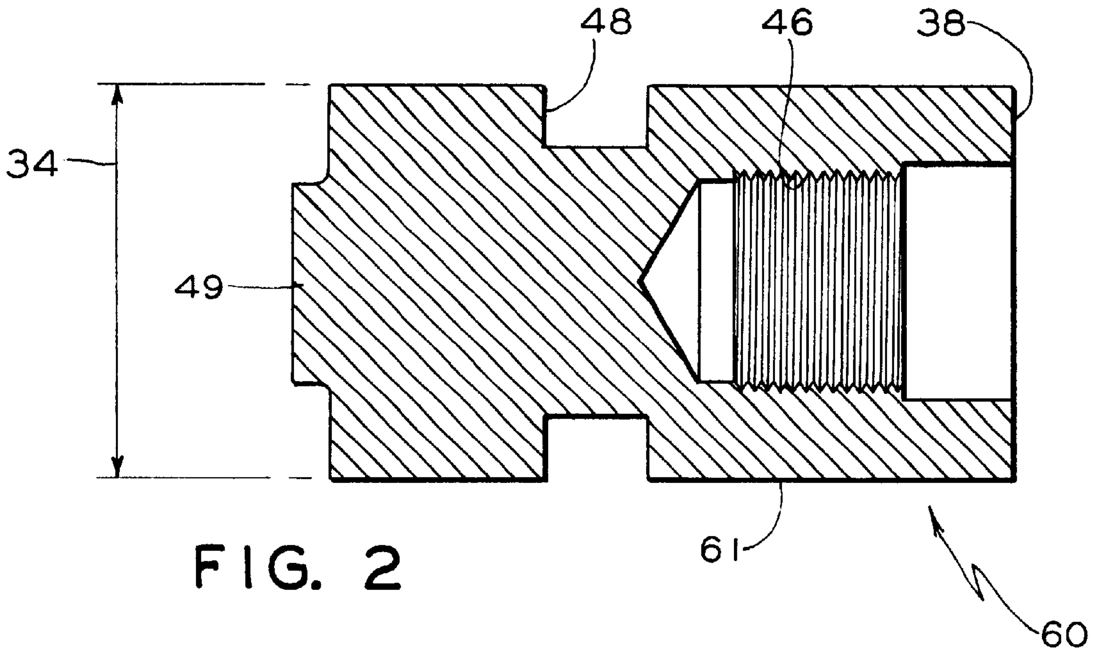
FIG. 2 is a median section through the piston illustrating details of the piston.
Figure 4:
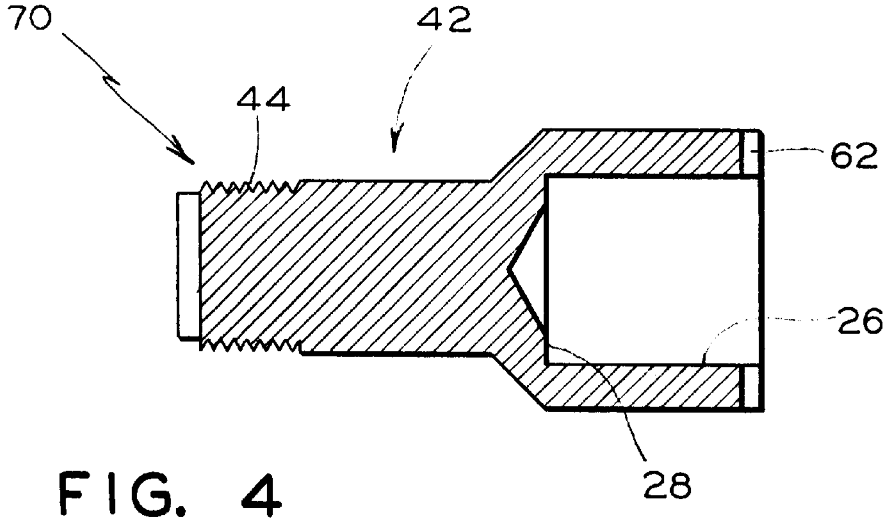
FIG. 4 is a median section of the connecting member illustrating details of the connecting member.

In the presently preferred embodiment shown, moveable jaw 50 is captured between a jaw engaging surface 38 of piston 60 and a jaw engaging surface 42 of connecting member 70 so that piston 60, moveable jaw 50 and connecting member 70 become a solid unit, which is the tool moveable portion 40. Surface 38 is best seen in FIG. 2 and surface 42 is best seen in FIG. 4.

Figure 3:
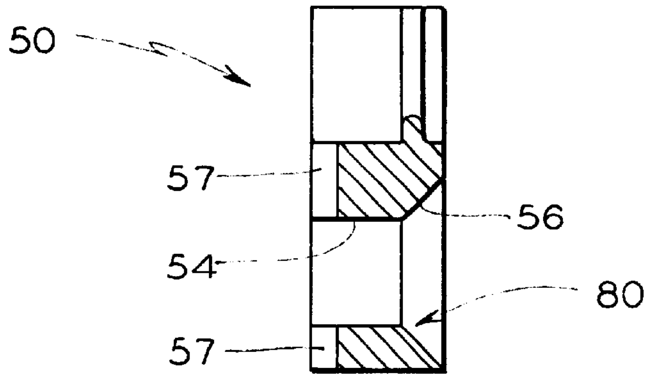
FIG. 3 is a median section through the moveable jaw illustrating details of the moveable jaw.

Preferably, connecting member 70 has male threads 44 engaging a threaded bore 46 in piston 60. Preferably, piston 60 is keyed to moveable jaw 50 to prevent rotation of piston 60 during attachment of connecting member 70. Keying surfaces 57 on moveable jaw 50 are shown in FIG. 3.

It is presently preferred that connecting member 70 engages moveable jaw 50 at a substantially axisymmetrical inner surface portion, generally designated 80, of moveable jaw 50. It is also preferred that substantially such axisymmetrical inner surface portion 80 of moveable jaw 50 include a substantially cylindrical inner surface portion 54 and a substantially conical inner surface portion 56.

Piston 60, preferably has a central protuberance 49 to provide an annular chamber 51 communicating with the fluid pressure port 15 so that fluid pressure supplied through port 15 is applied to piston 60 to provide the required hydraulic force on piston 60.

The hydraulic assembly tool 10, according to the presently preferred embodiment, is for installing swage ring fittings. Accordingly, fixed jaw 11 and moveable jaw 50 are configured to engage swage ring fittings so that assembly tool 10 may be employed to attach swage ring fittings to tubes or pipes.

Preferably, hydraulic assembly tool 10 includes a high pressure hydraulic seal 52 disposed between outer surface 61 of piston 60 and hydraulic cylinder 30 to prevent loss of hydraulic fluid. Preferably, hydraulic seal 52 is a T-seal disposed in circumferential groove 48 in piston 60.

It is preferred that connecting member 70 have at least one tool engaging surface 62 for engagement of a tool (not shown) for rotating connecting member 70 to thread connecting member 70 into piston 60.

FIG. 1 illustrates the hydraulic assembly tool 10 having a quick disconnect hydraulic fitting 58 threaded into fluid pressure port 15, and a hydraulic hose 64 attached at quick disconnect 58.

While the presently preferred and various additional alternative embodiments of the instant invention have been described in detail above in accordance the patent statutes, it should be recognized that various other modifications and adaptations of the invention may be made by those persons who are skilled in the relevant art without departing from either the spirit of the invention or the scope of the appended claims.

I claim:

1. A hydraulic assembly tool comprising:

a tool fixed portion having a proximal end and a distal end, said tool fixed portion including a hydraulic cylinder, said hydraulic cylinder having a fluid pressure port at said proximal end of said tool fixed portion, said fluid pressure port for receiving a fluid having a controllable pressure, said tool fixed portion including a fixed jaw;

a tool moveable portion including a moveable jaw and a piston disposed in said hydraulic cylinder, said piston to receive a hydraulic force from such pressurized fluid;

a connecting member attaching said moveable jaw to said piston, said connecting member including male threads for engaging a threaded bore in said piston;

a compression spring engaging said tool fixed portion and said tool moveable portion, said compression spring urging said tool moveable portion including said moveable jaw in a direction opposite a direction of said hydraulic force;

whereby increasing such pressure of such fluid causes said moveable jaw to move in a direction of said hydraulic force, and decreasing such pressure of such fluid permits said spring to move said tool moveable portion including said moveable jaw in a direction opposite said direction of said hydraulic force.

2. A hydraulic assembly tool, according to claim 1, wherein a fixed seat for said compression spring is disposed at said distal end of said tool.

3. A hydraulic assembly tool, according to claim 2, wherein said fixed seat includes a central protuberance for centering said spring.

4. A hydraulic assembly tool, according to claim 3, wherein said fixed seat is fixed to said tool by a lock ring.

5. A hydraulic assembly tool, according to claim 1, wherein said connecting member has an internal bore enclosing a moveable seat for said spring and further enclosing at least a portion of said spring.

6. A hydraulic assembly tool, according to claim 1, wherein said tool fixed portion further includes a distal bore at said distal end of said tool, said connecting member slidably engaging said distal bore to guide said tool moveable portion and to react moment loads on said moveable jaw.

7. A hydraulic assembly tool, according to claim 6, wherein said distal bore is concentric with said hydraulic cylinder.

8. A hydraulic assembly tool, according to claim 7, wherein said distal bore has a diameter substantially equal to a diameter of said hydraulic cylinder.

9. A hydraulic assembly tool, according to claim 8, wherein said tool fixed portion further includes a clearance portion disposed between said distal bore and said hydraulic cylinder.

10. A hydraulic assembly tool, according to claim 1, wherein said moveable jaw is captured between a jaw engaging surface of said piston and a jaw engaging surface of said connecting member, whereby said piston, said moveable jaw and said connecting member become a solid unit.

11. A hydraulic assembly tool, according to claim 9, wherein said piston is keyed to said moveable jaw to prevent rotation of said piston when said connecting member is threaded into said piston.

12. A hydraulic assembly tool, according to claim 1, wherein said connecting member engages said moveable jaw at a substantially axisymmetrical inner surface of said moveable jaw.

13. A hydraulic assembly tool, according to claim 12, wherein said substantially axisymmetrical inner surface of said moveable jaw includes a substantially cylindrical inner surface portion.

14. A hydraulic assembly tool, according to claim 12, wherein said substantially axisymmetrical inner surface of said moveable jaw includes a substantially conical inner surface portion.

15. A hydraulic assembly tool, according to claim 1, wherein said piston has a central protuberance to provide an annular chamber communicating with said port, said annular chamber to receive such fluid and provide said hydraulic force on said piston.

16. A hydraulic assembly tool, according to claim 1, wherein said fixed jaw and said moveable jaw are configured to engage swage ring fittings, so that said tool may be employed to attach such swage ring fittings to at least one of tubes and pipes.

17. A hydraulic assembly tool, according to claim 1, wherein said port is threaded to receive a hydraulic fitting.

18. A hydraulic assembly tool, according to claim 17, further including a quick disconnect hydraulic fitting threaded into said port.

19. A hydraulic assembly tool, according to claim 1, further including a high pressure hydraulic seal disposed between an outer surface of said piston and said hydraulic cylinder.

20. A hydraulic assembly tool, according to claim 19, wherein said high pressure hydraulic seal is a T-seal.

21. A hydraulic assembly tool, according to claim 9, wherein said connecting member has at least one tool engaging surface for engagement of a tool to rotate said connecting member to thread said connecting member into said piston.

22. A hydraulic assembly tool comprising:

a tool fixed portion having a proximal end and a distal end, said tool fixed portion including a hydraulic cylinder, said hydraulic cylinder having a fluid pressure port at said proximal end of said tool fixed portion, said fluid pressure port for receiving a fluid having a controllable pressure, said tool fixed portion including a fixed jaw;

a tool moveable portion including a moveable jaw and a piston disposed in said hydraulic cylinder, said piston to receive a hydraulic force from such pressurized fluid;

a connecting member attaching said moveable jaw to said piston wherein said moveable jaw is captured between a jaw engaging surface of said piston and a jaw engaging surface of said connecting member, whereby said piston, said moveable jaw and said connecting member become a solid unit;

a compression spring engaging said tool fixed portion and said tool moveable portion, said compression spring urging said tool moveable portion including said moveable jaw in a direction opposite a direction of said hydraulic force;

whereby increasing such pressure of such fluid causes said moveable jaw to move in a direction of said hydraulic force, and decreasing such pressure of such fluid permits said spring to move said tool moveable portion including said moveable jaw in a direction opposite said direction of said hydraulic force.

23. A hydraulic assembly tool, according to claim 22, wherein said connecting member engages said moveable jaw at a substantially axisymmetrical inner surface of said moveable jaw.

24. A hydraulic assembly tool, according to claim 23, wherein said substantially axisymmetrical inner surface of said moveable jaw includes a substantially conical inner surface portion.

* * * * *